United States Patent
Stein et al.

(10) Patent No.: US 8,189,574 B2
(45) Date of Patent: May 29, 2012

(54) METHOD AND DEVICE FOR PROVIDING COMMUNICATION SERVICES

(75) Inventors: Shai Stein, Raanana (IL); Moredechay Morgenstern, Petach Tikva (IL); Ofer Reviv, Moshav Timorim (IL)

(73) Assignee: ECI Telecom Ltd., Petach Tikva (IL)

( * ) Notice: Subject to any disclaimer, the term of this patent is extended or adjusted under 35 U.S.C. 154(b) by 701 days.

(21) Appl. No.: 10/587,938

(22) PCT Filed: Feb. 15, 2005

(86) PCT No.: PCT/IL2005/000189
§ 371 (c)(1),
(2), (4) Date: Aug. 2, 2006

(87) PCT Pub. No.: WO2005/084070
PCT Pub. Date: Sep. 9, 2005

(65) Prior Publication Data
US 2007/0121576 A1 May 31, 2007

(30) Foreign Application Priority Data
Mar. 1, 2004 (IL) .......................................... 160665

(51) Int. Cl.
*H04L 12/50* (2006.01)

(52) U.S. Cl. ....................................... 370/386; 370/401

(58) Field of Classification Search .................. 370/310, 370/351, 352, 389, 386, 458, 437, 410; 375/222
See application file for complete search history.

(56) References Cited

U.S. PATENT DOCUMENTS

| | | | | |
|---|---|---|---|---|
| 5,903,372 A | * | 5/1999 | Czerwiec | 398/66 |
| 5,920,571 A | * | 7/1999 | Houck et al. | 370/458 |
| 2002/0101851 A1 | * | 8/2002 | Blake et al. | 370/352 |
| 2002/0135844 A1 | * | 9/2002 | Silberman et al. | 359/167 |
| 2003/0012227 A1 | * | 1/2003 | Daniels | 370/485 |
| 2003/0037095 A1 | * | 2/2003 | Sharma | 709/201 |
| 2003/0108095 A1 | * | 6/2003 | Duvaut et al. | 375/222 |
| 2003/0112963 A1 | * | 6/2003 | Chen et al. | 379/399.01 |
| 2003/0210690 A1 | * | 11/2003 | Hennehoefer et al. | 370/389 |
| 2004/0049795 A1 | * | 3/2004 | Briggs et al. | 725/100 |
| 2004/0160905 A1 | * | 8/2004 | Bernier et al. | 370/310 |
| 2005/0078690 A1 | * | 4/2005 | DeLangis | 370/401 |
| 2006/0228113 A1 | * | 10/2006 | Cutillo et al. | 398/71 |

FOREIGN PATENT DOCUMENTS
WO WO 03/065592 A 8/2003

* cited by examiner

Primary Examiner — Pao Sinkantarakorn
Assistant Examiner — Ajay Cattungal
(74) Attorney, Agent, or Firm — Browdy and Neimark, PLLC

(57) ABSTRACT

Technology for providing subscribers with communication services in accordance with their agreements with a service provider, that comprises: a) determining a plurality of subscribers to be connected to the service provider via a distribution unit located in an access network; b) selecting a default advanced broadband technology (DABT) for the distribution unit; c) in the distribution unit, providing a plurality of communication devices to reserve for each of the plurality of subscribers, irrespective of their agreements reached with the service provider, an individual communication link for supplying broadband communication services based on the selected DABT; while d) enabling each of the plurality of subscribers to receive services in accordance with their respective agreements with the service provider.

12 Claims, 3 Drawing Sheets

METHOD AND DEVICE FOR PROVIDING COMMUNICATION SERVICES

FIELD OF THE INVENTION

The invention relates to the field of telecommunications, more particularly to technologies of providing end users with various types of telecommunication services.

BACKGROUND OF THE INVENTION

Nowadays, communication access networks and, in particular, their Local Exchanges (sometimes called Central Offices) are adapted to provide a variety of subscriber lines, for example: basic analogue POTS (Plain Old Telephone Service) lines for delivering voice, various types of symmetric and asymmetric digital subscriber lines (DSL) being high-speed connection lines that use the same wires as regular telephone lines, so-called ISDN lines (Integrated Service Digital Network), which is a system of digital phone connections that allows voice and data to be transmitted simultaneously using end-to-end digital connectivity.

So-called broadband access networks are capable of delivering advanced voice, data and video services to end users (subscribers), by using enhanced DSL and ISDN solutions, and by interconnecting to IP, ATM and various wireless and cellular networks.

The conventional and worldwide accepted way of providing a private subscriber with telecommunication services usually means "tailoring" the access network infrastructure according to the end user's specific demand at the time of arranging the subscription. If the end user orders only a telephone voice service, he/she is given a conventional POTS line. In cases the end user wishes to get more advanced services at home, allowing him to use a digital telephone, a fax machine, a computer, the end user may receive a DSL line. For arranging local area networks for small offices or the like, and/or for easily using high rate data services, such as video and fast internet, the subscriber will be offered advanced DSL solutions, such as ADSL (Asynmmetric DSL), VDSL (Very high data rate DSL), SH-DSL (Single pair High bit rate DSL), ISDN, and/or other broadband telecommunication services.

So called Digital Subscriber Line Access Multiplexer (DSLAM) is a distribution unit located at the Local Exchange or at a street cabinet, which is positioned between the Local Exchange and the subscribers, comprises a plurality of different "line cards" which suit to different types of services available from the Local Exchange and ordered by the subscribers. For example, a DSLAM may include, in various combinations, a number of POTS (voice only) line cards for voice only subscribers, a number of ADSL cards for residential asymmetric services, a number of SDSL cards with a single or multiple pairs for symmetric services, a number of VDSL cards for symmetric business services or asymmetric high speed residential services, a number of combined POTS and DSL cards (so-called Integrated Voice-Data "IVD" cards), etc.

Each subscriber, when first connected to the Local Exchange, obtains the service according to the personal demand. In most cases, connecting a new subscriber to the Local Exchange requires rewiring the DSLAM at the Local Exchange. In case the DSLAM is located in a street cabinet, connecting a new subscriber to the Local Exchange will mean a special visit of a technician to the street cabinet.

Once the subscriber decides to upgrade or downgrade the communication services in the premises, a technician may need to rewire the DSLAM at the Local Exchange or the street cabinet and add or replace the installed line cards in the DSLAM, if the specific requested service penetration exceeds preliminary expectations with respect to the mixture of line cards in the DSLAM.

U.S. Pat. No. 5,903,372 describes an apparatus for remote addition of video services to subscriber, which comprises an optical network unit (ONU) connected by an optical fiber to a remote terminal such as CO. The ONU is intended for installation in a neighborhood of primary subscribers (those which require only POTS lines) and secondary subscribers (those who order video services). The ONU comprises POTS cards, switchable video cards, dedicated video cards (i.e., combined with POTS), and hard-wired video cards. The subscribers' requirements may change from time to time. The ONU includes a switch matrix card that, being remotely controlled from the CO, is capable of connecting the primary and the secondary subscribers to the service cards and/or their combinations, which respectively suit to the specific current requirements of the subscribers.

Both the installation and maintenance of such an ONU, if installed in a street cabinet, seems to be quite expensive. Furthermore, the number of cards to be installed of each of the types should be decided at the time of installing such ONU, a fact that adds to the problems associated with this solution.

In any of the described cases, determining the optimal ratio between the broadband services and narrowband services in the access networks (i.e., and therefore the mixture of line cards in each distribution unit) is always a multi-parameter task, since it should take into account the present demand, the technological and sociological trends, as well as various economical factors.

SUMMARY OF THE INVENTION

It is therefore the object of the present invention to resolve the above problem of upgrading/downgrading the telecommunication services provided to the subscribers in a converged narrowband and broadband networks, and also the problem of designing suitable access systems, in particular—the problem of designing a right mixture of line cards in the DSLAM in street cabinets and Local Exchanges. Further objects and features of the invention will become apparent from the following description and the accompanying drawings.

According to a first aspect of the invention, there is disclosed a method of providing end users (subscribers) with communication services in accordance with their agreements with a service provider (e.g. a telecom company). The method comprises:

associating a plurality of subscribers that will be connected to the service provider via a distribution unit located in an access network;

determining a default advanced broadband technology (DABT) for the distribution unit in the distribution unit, providing a plurality of communication devices to reserve for each of the plurality of subscribers, irrespective of their agreements reached with the service provider, an individual link for supplying broadband communication services based on said DABT; and enabling each of the plurality of subscribers to receive services in accordance with their respective agreements with the service provider.

For example, determining the DABT for the distribution unit can be performed by selecting it to be equal or more advanced than the most advanced technology ("MAT") agreed upon between at least one of the plurality of subscribers and the service provider.

Determining the DABT may also depend on many factors, such as geographical location of the distribution unit, distances between the subscribers and the distribution unit, social status and trend of population in the area, perspectives of technological development in the area, etc.

The term "reserving" should be understood as providing for each particular subscriber an individual broadband communication link, though postponing use of the broadband capacity of the link till the subscriber orders specific broadband services from the service provider.

Let us assume that one (or more) of the subscribers associated with that distribution unit requires a VDSL service, while the rest of the subscribers require ADSL or even narrowband communication services. By a preferred embodiment of the invention, all the cards (internal communication devices intended for serving subscribers) that will be installed in that distribution unit, e.g. the street cabinet, will be of a VDSL type.

In the simplest case the narrowband service can be understood as a voice service.

The method is preferably based on providing an infrastructure that supports a uniform (one and the same), usually most advanced telecommunication technology for all subscribers, be it a subscriber who should be provided with a voice only service that could have been satisfied by using a simple POTS link(or a subscriber that actually ordered a most demanding service. Even if the agreement for a specific communication service with a particular end user were for the provision of an analogue telephony, the service would arrive to the customer premises over a digital medium, even though it exceeds the current needs of that end user.

As has been mentioned, selection of the DABT and consequently, selection of the type of said communication devices to be used may depend on various factors. For example, the type of the communication devices that are adapted to provide the technologically advanced broadband service can be selected for a particular distribution unit from a non-exhausting list comprising ADSL (Asymmetrical Digital Subscriber Line), VDSL (Very high data rate DSL), SHDSL (Single line High bit-rate DSL). It is understood that the list may include other more progressed versions of the advanced broadband telecommunication services, for example: Asymmetrical Digital Subscriber Line 2 (ADSL2), Asynmetrical Digital Subscriber Line 2+ (ADSL2+), Very high bit-rate Digital Subscriber Line 2 (VDSL2), etc. The term DABT as used herein should be understood also to encompass use of a more advanced technology in a number of communication devices for the provision, to number of subscribers, services that are more advanced than those determined as the default selection.

According to a preferred embodiment of the invention, the method further comprises blocking (e.g. filtering out) all additional services which could be supported by the communication devices and provided to the subscriber, but which are not included in the agreement between that subscriber and the service provider.

Based on the above, there is also proposed a method of providing a narrowband subscriber with communication services in a converged broadband and narrowband communications access network, the method comprises establishing a link to said narrowband subscriber, which is capable of carrying broadband communication services, while preventing (blocking) the use, by said subscriber, of all communication services not included in an agreement between said subscriber and a service provider.

The step of establishing the link to the narrowband subscriber should be understood as installing physical means that are adapted to allow transmission of broadband communication services from a distribution unit up to the subscriber's premises, including, without limitation, providing in the distribution unit a suitable communication device (card, module, and the like) that will enable the provision of such services. The method further ensures that the services eventually received by that narrow subscriber are only narrowband services.

By yet another preferred embodiment, the step of blocking is done by carrying out a remote configuration of the appropriate communication device located at the distribution unit, where the configuration (hardware and/or software) is carried out from the Local Exchange connected to that distribution unit. Similarly, when the subscriber updates his/her agreement with the service provider by including further services which could be supported by his/her existing communication device, this device can be re-configured from the Local Exchange to affect the required change in the agreement by allowing the provision of additional (or less, as the new agreement may be) services.

In the alternative or in addition, the method preferably comprises providing at least one of the subscribers connected via the distribution unit, with a Customer Premises Equipment (CPE) unit specifically configured to provide only services in accordance with his/her agreement with the service provider. In other words, the CPE is configured to allow certain services while blocking (filtering out) others. For example, if the subscriber requires voice only service, than although the link extending between the subscriber and the distribution unit is adapted to support conveying of broadband communications, still only signals that are transmitted at the voice band frequency shall pass the CPE. When the subscriber agrees with the service provider on an upgrade of the service received, the service provider may either by remotely re-configuring the CPE, or by providing the subscriber with an appropriate password or software or by replacing the CPE unit, or by any other acceptable way which does not require a visit of the service provider's representative at the distribution unit, allow the subscriber access to receive such an upgraded service.

In the method defined above, the distribution unit (usually, in the form of DSLAM—DSL Access Multiplexer) is preferably located as close to the end user as possible (e.g., in a street cabinet) for that maximizes the benefits of the invention by enabling use of the most advanced technology available, such as VDSL. VDSL enables running any type of service over the DSL line, including symmetric and asymmetric applications.

The proposed method enables eliminating the need for frequent DSLAM re-wirings and line cards (communication devices) installation changes. Though it seems rather expensive at the stage of providing the telecommunication infrastructure, it brings certain advantages owing to its uniformity and modularity. Further, it turns to be cost-effective at the stage of actual connecting subscribers to the infrastructure since it does not require rewiring or changing the mixture of line cards in the distribution unit or visiting the subscriber's neighborhood.

As described above, utilizing a uniform broadband technology even for providing analogue telephony service to the end user actually brings the telephony service to the premises over a digital medium. This enables providing enhanced and advanced features to the end user even while he/she remains a voice-only customer. These features (e.g., sending to a user short alphanumeric messages that can be displayed if the end user has a certain type of telephony equipment) are usually unavailable with the analogue medium.

Utilizing a broadband technology even for providing analogue telephony service to the end user also allows reusing the spectrum, which is usually occupied by analogue voice services, for any digital services. In advanced DSL technologies this mode is called All Digital mode.

According to a second aspect of the invention, there is provided a communication service distribution unit for use in a converged broadband and narrowband access network, adapted to provide a technologically advanced broadband communication service, as a minimal default communication service, to substantially all end users (subscribers) associated with the distribution unit, wherein said end users include at least one narrowband subscriber (i.e. that currently requires narrowband communication service.) The term "substantially all subscribers" should be understood as a plurality of subscribers, including voice only subscribers associated with the distribution unit, taken as a concept of providing, by default, equal advanced telecommunication infrastructure for the clientele of a converged narrowband and broadband network provider associated with that distribution unit.

However, according to one embodiment of the invention, the distribution unit may be adapted to provide a more technologically advanced communication service (over the default) to a limited number of the subscribers.

According to the present invention, the distribution unit comprises a plurality of communication devices adapted for providing a substantially uniform type of the broadband communication services to the clientele of a converged narrowband and broadband network provider, so as to avoid visits of a technician to the distribution unit when any of the end users decides to upgrade/downgrade the previously ordered services.

However, as would be appreciated by those skilled in the art, the distribution unit of the present invention may further comprise a limited number of narrowband cards that are not communicationly linked to any of the subscribers.

According to one preferred embodiment of the invention, the distribution unit comprises a plurality of communication devices (cards) capable of providing one and the same type of technologically advanced broadband communication services to all broadband and narrowband subscribers associated with the unit.

According to yet a further aspect of the invention, there is provided a communication service distribution unit for use in a converged narrowband and broadband access network, comprising at least one communication device (card, module, etc.) capable of providing a broadband communication service and associated with a narrowband subscriber.

The term "associated with" should be understood in a broad meaning, to cover "intended for serving", "configured for", as well as "linked to".

Preferably, the broadband communication service is a technologically advanced type of communication service selected from the non-exhaustive list mentioned above. The narrowband subscriber is a subscriber currently requiring from the service provider (according to an agreement there-between) communication services technologically less advanced than said broadband communication service. In the simplest case, the narrowband subscriber is a subscriber ordering from the service provider voice service only.

According to a further aspect of the invention, there is provided a service filtering (or blocking) software and/or hardware means operative to derive, from a technologically advanced broadband communication service reserved for a particular subscriber at a distribution unit in an access network, only communication services (say, a narrowband service) agreed between said particular subscriber and a service provider.

Preferably, the service filtering means is configurable.

The service filtering means can be located at the distribution unit, be associated with a suitable communication device providing said broadband communication service, and be configurable remotely (say, from a Local Exchange).

Alternatively, or in addition, the service filtering means may comprise a Customer's Premises Equipment (CPE) unit for use in a subscriber's premises, in conjunction with said distribution unit.

The CPE can be exchanged when the subscriber wishes to upgrade/downgrade the communication services he/she receives according to the agreement with a service provider.

Preferably, the CPE is re-configurable, and the reconfiguring can be performed in many various ways, both remotely, and on the site: say, by downloading a new software, utilizing a key, a password, etc.

According to an additional aspect of the invention, there is provided a set of access network equipment, comprising at least one above-defined distribution unit and at least one said service filtering means.

Furthermore, there is provided a system for providing broadband and narrowband subscribers with communication services in accordance with their agreements with a service provider, the system comprises a distribution unit accommodating at least one communication device operative to provide a broadband communication service and connected to a narrowband subscriber via a service filtering means; the service filtering means serving for preventing the use, by the narrowband subscriber, of communication services not included in an agreement between said narrowband subscriber and the service provider.

The distribution unit can be, for example, a Street cabinet or a Central Office (Local Exchange).

Preferably, the distribution unit is a Street cabinet connected to a Central Office via a fiber optic cable.

The service filtering means may be located at the narrowband subscriber's premises and/or be associated with the suitable communication device in the distribution unit.

The Central Office preferably comprises means for remotely configuring and reconfiguring the service filtering means. The system may further comprise means for subscribers' policy control.

BRIEF DESCRIPTION OF THE DRAWINGS

The invention will be further described and illustrated in more detail with reference to the following non-limiting drawings, in which.

DETAILED DESCRIPTION OF THE PREFERRED EMBODIMENTS

Figure 1:
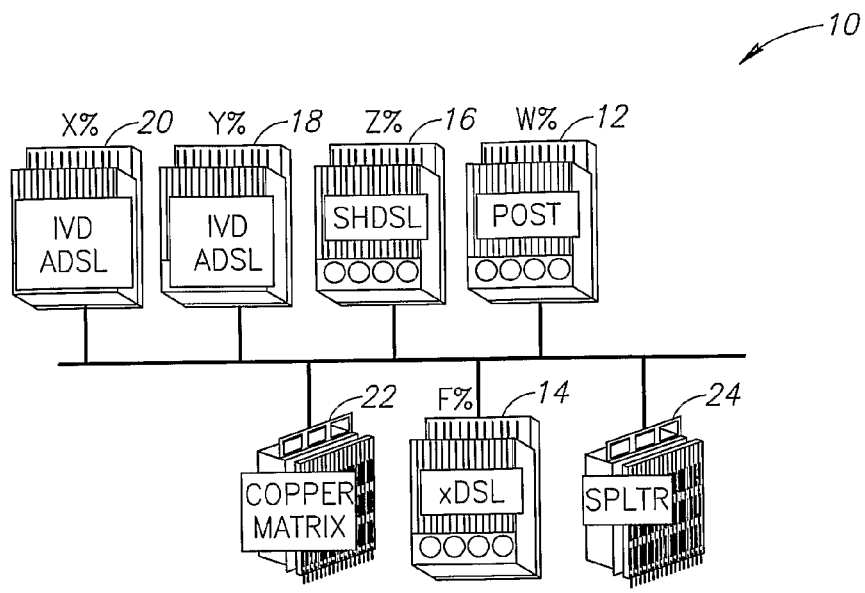
FIG. 1 (prior art) schematically illustrates a usual distribution of various cards in a street cabinet for supplying terminal subscribers with different communication services, beginning from voice only and up to VDSL.

FIG. 1 schematically illustrates the components, which are presently designed for and utilized in a typical distribution device (street cabinet or Local Exchange).

In this example, a street cabinet system (schematically marked 10) can be connected to the Local Exchange by an optical fiber (not shown) and comprises a number of POTS (Plain Old Telephony Service) cards 12 for voice only subscribers, a number of xDSL (represents any of various Digital Subscriber Line technologies) cards 14, some SHDSL (Single-pair High-bit-rate Digital Subscriber Line) cards 16 for symmetric data subscribers, and a number of Integrated Voice-Data cards IVD 18 and 20, intended for subscribers ordering both the voice services and the data services. Types of the cards (such as IVD ADSL or IVD VDSL) may be different and depend on particular combinations of services, which are required.

Advanced street cabinets may further include a copper matrix 22 and a set of splitters 24.

Problems of the communication service providers, before purchasing a particular street cabinet, are the following:

1. Estimation of the broadband services penetration to a particular area, for selecting the ratio between "voice only" subscribers and "voice &data" subscribers. If the broadband penetration were underestimated, the cabinet would quickly require rewiring of existing shelves and even providing new shelves.

2. Estimation of the ratio between penetration of various DSL technologies: ADSL, SHDSL, and VDSL.

Since the proportion between different types of cards is unknown in each particular case, all the units are marked with unknown percentage values X, Y, Z, W, F.

Figure 2:
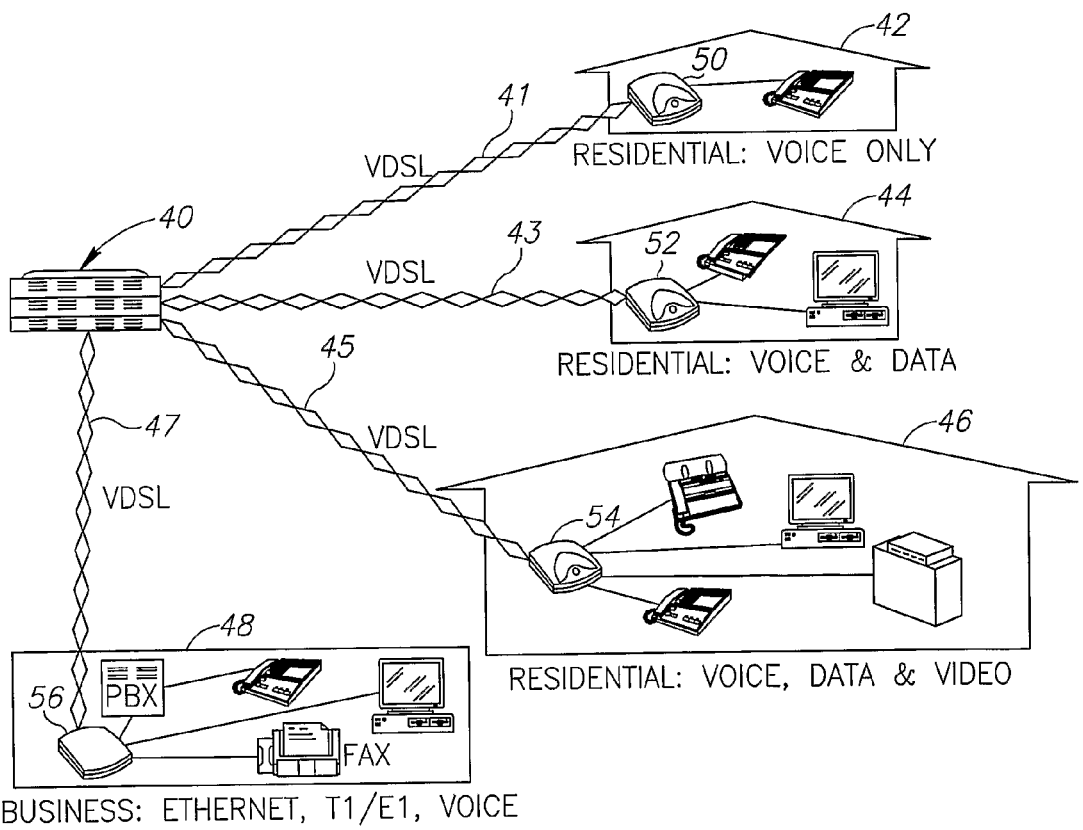
FIG. 2 schematically illustrates one example of a so-called "last mile copper solution" proposed by the invention.

FIG. 2 schematically illustrates the proposed method of supplying the end users with communication services in an access network.

In this particular example, all cards in a street cabinet 40 are the Integrated Voice and Data (IVD) cards, and the street cabinet 40 provides all its subscribers, by default, with an advanced broadband Very high bit-rate Digital Subscriber Line technology (VDSL and/or any of its successors such as VDSL2).

Alternatively, the communication lines may provide ADSL2+ broadband technology, SHDSL, ADSL or, generally, any DSL technology selected for this particular distribution unit. Selection of the minimal default type of the broadband communication service depends on the specific geographic area including distances between the subscribers and the distribution unit, its present maximal demands for telecommunication services, its perspectives for technological development, sociological trends in the population, etc.

Each subscriber at his/her premises (42, 44, 46, 48) receives a communication line (only one line per subscriber is shown: 41, 43, 45, 47) enabling the subscriber to use the most advanced broadband services over the DSL line.

To derive the required service from the default line, every subscriber, in this particular example, is equipped with a personally configured CPE (Customer Premises Equipment: 50, 52, 54, 56). For example, a POTS-only CPE 50 powered from a remote site, over the copper line, can be manufactured at a very low cost and comprise a splitter with a POTS/low pass filter. Current configurations of various CPE devices (exemplary device 52, 54, 56 are shown) are selected according to each particular case and will not be discussed in the frame of the present application.

The proposed approach will guarantee the VDSL performance to all subscribers by default, including the voice-only subscribers. It will make digital services available to all the subscribers, and will also enhance the voice services. It will as well allow utilizing the spare voice spectrum for the digital data services. The proposed approach enables using uniform cards in the street cabinet and almost excludes visits of operators to the remote sites, since if a subscriber wishes to change its profile of the ordered services, he/she will simply be provided with a suitable configuration for his/her existing CPE, or with a replacing CPE.

Figure 3:
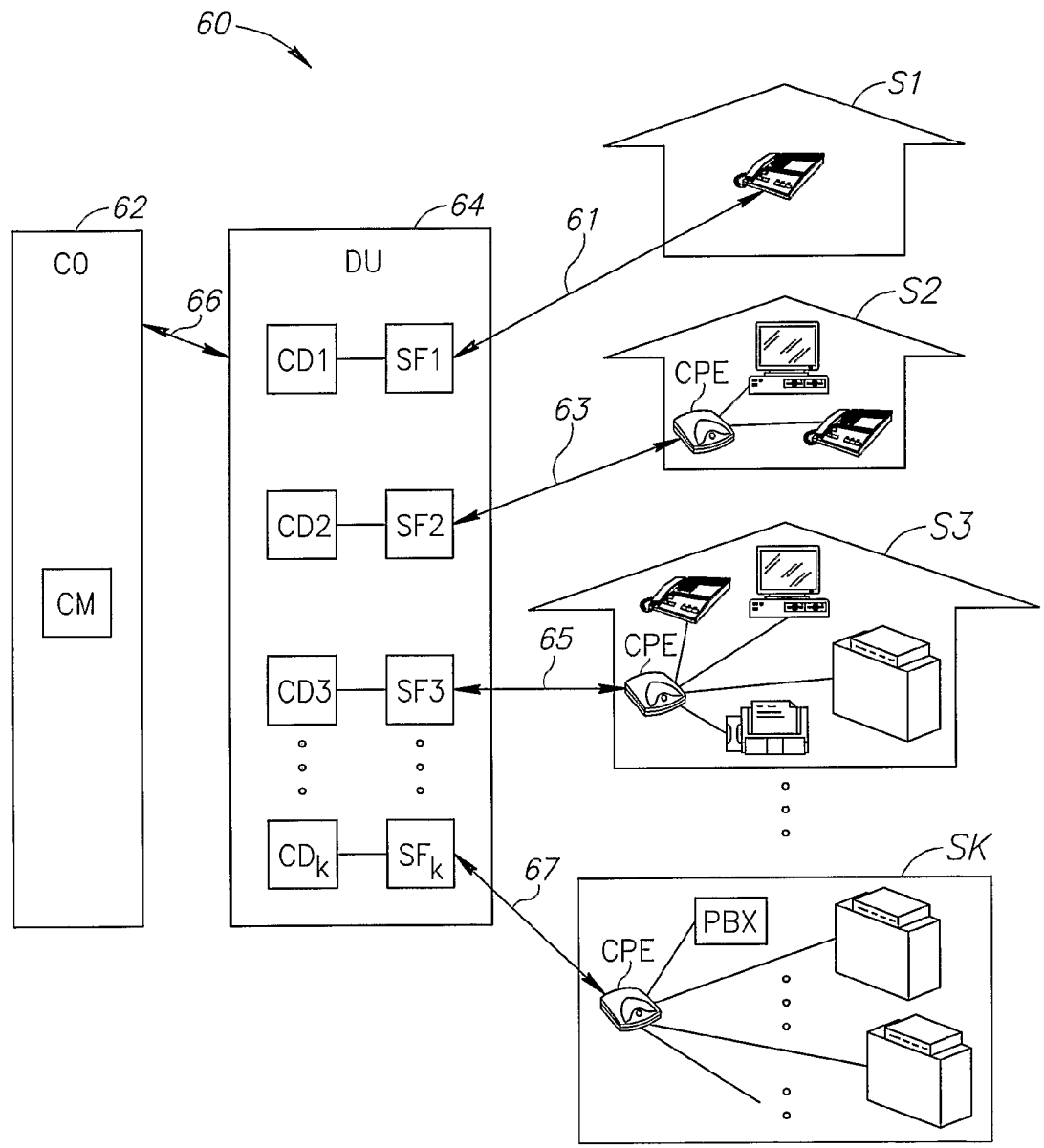
FIG. 3 schematically illustrates an exemplary system according to the invention.

FIG. 3 shows a simplified telecommunication system 60 comprising a Central Office 62 connected to a Distribution Unit (DU) 64 via, say an optical fiber 66, while the DU is linked to its associates subscribers S1, S2, S3, Sk via respective lines 61, 63, 65 and 67. The DU is a DSLAM. Among the DU subscribers, one is a narrowband subscriber S1 which uses only the regular telephone (voice) service, another one is subscriber S2 which uses voice and data services, the third one is a real broadband consuming subscriber S3 utilizing video services in addition to other services. Let us suppose that the distribution unit 64 serves a number of additional subscribers (not shown), which order communication services not exceeding the range of services required by the mentioned three subscribers S1-S3. There is, however, one exceptionally advanced subscriber Sk, which requires the most advanced broadband technology non-typical for the subscribers of the DU 64.

In this example, the distribution unit DU 64 may comprise uniform broadband communication devices CD1-CD3 which are capable of supplying a uniform advanced broadband technology (which is selected as the default) to the subscribers S1-S3. For the subscriber Sk, the DU may exceptionally include a communication device CDk, for example supporting VDSL2.

In order to provide each one of the subscribers with the bandwidth and services according to their particular agreements with the service provider, the distribution unit may comprise hardware and/or software service filtering blocks SF1-SFk, preferably remotely configurable. As a result, the voice subscriber S1 can be provided with the POTS service directly from the unit 64 via line 61, while other subscribers will preferably need additional service filtering devices (customer premises equipment—CPE) at the premises, to enable splitting and utilizing the filtered individual sets of services.

In this example, the Central Office 62 comprises means for remotely configuring the service filtering blocks SF1-SFK (block CM). To prevent violation of current agreements with the service provider from the side of subscribers, at least one of the blocks 62, 64 and CPE blocks can be provided with means for detecting use of services exceeding those allowed according to particular agreements.

Figure 4:
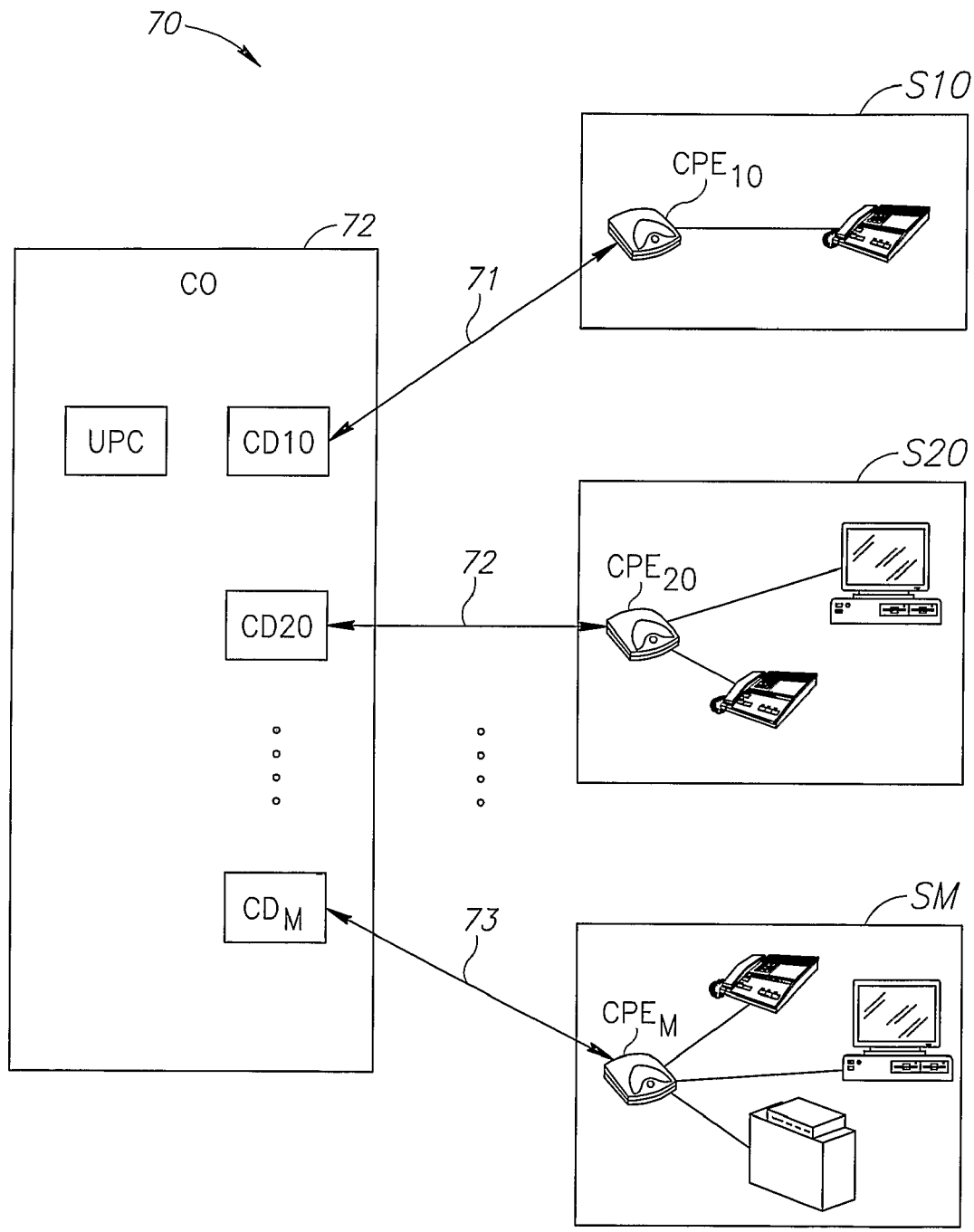
FIG. 4 illustrates another example of the proposed system.

FIG. 4 illustrates an embodiment 70 of the system, where the distribution unit is a Central Office (CO) 72 directly connected to its narrowband and broadband subscribers S10, S20 . . . Sm. In this embodiment, the communication devices CD10-CDm in the CO provide uniform broadband communication services to the lines 71, 72, . . . 73. To enable using, by each of the different subscribers, only the services individually purchased from the service provider, each of the subscribers is provided with a suitable configured CPE (CPE10, CPE20 . . . and CPEm), which is installed at the subscribers' premises and serves as an individual service filtering/splitting means. If a particular subscriber wishes to upgrade/downgrade the communication services he/she receives from the service provider, the subscriber's CPE may be reconfigured or just replaced.

To monitor and control the services really used by the subscribers, the CO 72 preferably performs a so-called users policy control (block UPC). Alternatively or in addition, CPEl-CPEm can be provided with a functionality of monitoring and detecting the use of non-agreed services.

It should be appreciated that slight changes in the proposed method and arrangement of the distribution unit are possible and still constitute part of the present invention, while covered by the patent claims that follow.

It is appreciated that various features of the invention that are, for clarity, described in the contexts of separate embodiments may also be provided in combination in a single embodiment. Conversely, various features of the invention which are, for brevity, described in the context of a single embodiment may also be provided separately or in any suitable sub-combination.

It will be appreciated by persons skilled in the art that the present invention is not limited by what has been particularly shown and described herein above. Rather the scope of the invention is defined by the claims that follow.

The invention claimed is:

1. A method of providing subscribers with communication services in accordance with their agreements with a service provider, the method comprising: determining a first plurality of subscribers to be connected to the service provider via a distribution unit located in an access network, the first plurality comprising different subscribers having current requirements for technologically advanced broadband communication services or for technologically less advanced communication services, respectively; in the distribution unit, providing a second plurality of communication devices for serving the first plurality of subscribers, selecting an advanced broadband technology to be produced by the distribution unit to be a default advanced broadband technology (DABT), wherein DABT is a more advanced than technology currently required by at least one of the subscribers; in the distribution unit, arranging said second plurality of communication devices so that said second plurality consisting only of uniform communication devices using the DABT, providing for each of said subscribers, irrespective of its individual agreement reached with the service provider, an individual permanent communication link for supplying, from one of the communication devices, respective broadband communication services by using said DABT, and enabling each of the plurality of subscribers to receive services in accordance with their respective agreements with the service provider, while reserving use of broadband capacity of each individual permanent communication link until the service agreements are upgraded.

2. The method according to claim 1, wherein said DABT is VDSL (Very high data rate Digital Subscriber Line).

3. The method according to claim 1, wherein at least one of the subscribers is entitled to narrowband services only.

4. The method according to claim 1, further comprising preventing the use, by a particular subscriber, of communication services not included in the agreement between said particular subscriber and the service provider.

5. A communication service distribution unit for use in a converged broadband and narrowband access network, comprising a first plurality of uniform communication devices for serving a non-uniform second plurality of subscribers associated with the distribution unit and comprising broadband and narrowband subscribers, wherein each of said communication devices are configured to provide to its corresponding subscriber a technologically advanced broadband communication service selected as a default advanced broadband technology (DABT) of said distribution unit, said DABT being a more advanced than technology currently required by at least one of the subscribers; wherein said first plurality consists only of uniform communication devices using the DABT, thereby enabling each of the plurality of subscribers to receive communication services in accordance with their respective current requirements, while reserving use of DABT until service agreements are upgraded.

6. The distribution unit according to claim 5, adapted to provide a more technologically advanced communication service to a limited number of the subscribers.

7. The distribution unit according to claim 5, wherein said broadband communication service is a technologically advanced type of communication service selected from a non-exhaustive list comprising: ADSL (Asymmetrical Digital Subscriber Line), VDSL (Very high data rate DSL), SHDSL (Single line High bit-rate DSL).

8. The distribution unit according to claim 5, comprising a plurality of communication devices capable of providing one and the same technologically advanced broadband communication service to all broadband and narrowband subscribers associated with the unit.

9. The communication service distribution unit according to claim 5, capable of remotely configuring service filtering means associated with a communication device providing said DABT communication service at the distribution unit.

10. The service filtering means according to claim 9, comprising a Customer's Premises Equipment (CPE) unit for use in said subscriber's premises.

11. The distribution unit according to claim 5, comprising a service filtering means operative to derive, from the technologically advanced broadband communication service reserved for a particular subscriber at the distribution unit, only communication services agreed between said particular subscriber and a service provider.

12. A system for providing broadband and narrowband subscribers with communication services in accordance with their agreements with a service provider, the system comprises a distribution unit consisting only of uniform communication devices using a default advanced broadband technology (DABT) for serving said subscribers, wherein DABT is a more advanced than technology currently required by at least one of said subscribers; the system further comprises individual permanent communication links for connecting the communication devices with respective subscribers, and service filtering means for at least one of said subscribers;

at least one of said communication devices is connected to a narrowband subscriber via an individual permanent communication link and via a service filtering means; the service filtering means being operative to prevent the use by the narrowband subscriber of communication services not included in an agreement between said narrowband subscriber and the service provider while reserving use of broadband capacity of each individual permanent communication link until the service agreements are upgraded.

\* \* \* \* \*